United States Patent
Son et al.

(10) Patent No.: US 11,061,497 B2
(45) Date of Patent: Jul. 13, 2021

(54) TOUCH SENSOR, AND WINDOW LAMINATE AND IMAGE DISPLAY DEVICE INCLUDING THE SAME

(71) Applicant: DONGWOO FINE-CHEM CO., LTD., Iksan-si (KR)

(72) Inventors: Dongjin Son, Asan-si (KR); Beomcheol Kim, Pyeongtaek-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 16/937,743

(22) Filed: Jul. 24, 2020

(65) Prior Publication Data

US 2021/0026468 A1    Jan. 28, 2021

(30) Foreign Application Priority Data

Jul. 25, 2019    (KR) .................. 10-2019-0090521

(51) Int. Cl.
*G06F 3/041* (2006.01)

(52) U.S. Cl.
CPC .... *G06F 3/041* (2013.01); *G06F 2203/04102* (2013.01)

(58) Field of Classification Search
CPC . G06F 2203/04102; G06F 2203/04103; G06F 3/041; G06F 3/04164; G06F 3/047; G06F 3/0412; H01L 51/5253; H05K 1/117; H05K 3/027; H05K 3/363; G02F 1/13338; G02B 6/0083; H01R 12/62

See application file for complete search history.

(56) References Cited

U.S. PATENT DOCUMENTS

| 6,384,339 | B1 * | 5/2002 | Neuman | H05K 3/363 174/254 |
| 2007/0013856 | A1 * | 1/2007 | Watanabe | H01R 12/62 349/150 |
| 2009/0103282 | A1 * | 4/2009 | Itaya | G02B 6/0083 362/97.1 |
| 2011/0057893 | A1 * | 3/2011 | Kim | G06F 3/0412 345/173 |
| 2014/0048310 | A1 * | 2/2014 | Montevirgen | H05K 3/363 174/250 |

(Continued)

FOREIGN PATENT DOCUMENTS

KR    10-2014-0134227 A    11/2014

*Primary Examiner* — Richard J Hong
(74) *Attorney, Agent, or Firm* — Sughrue Mion, PLLC

(57) ABSTRACT

A touch sensor includes a touch sensor panel, an FPCB, a conductive adhesive layer, and a protective layer. The touch sensor panel includes a display part having a sensing electrode and a bezel part having a trace and a bonding pad. The FPCB includes an FPC electrode layer having one side connected to the bonding pad, an upper cover layer coupled to an upper portion of the FPC electrode layer, and a lower cover layer coupled to a lower portion of the FPC electrode layer while opening a portion of the FPC electrode layer. The upper cover layer extends to at least a portion of the trace including the bonding pad. The conductive adhesive layer is coupled between the bonding pad and the FPC electrode layer. The protective layer covers the touch sensor panel and the upper cover layer of the bezel part.

18 Claims, 4 Drawing Sheets

(56) References Cited

U.S. PATENT DOCUMENTS

| | | | |
|---|---|---|---|
| 2014/0340597 A1* | 11/2014 | Sato | G02F 1/13338 349/12 |
| 2016/0162062 A1* | 6/2016 | Furukawa | G06F 3/04164 345/173 |
| 2016/0313838 A1* | 10/2016 | Lee | G06F 3/04164 |
| 2019/0036073 A1* | 1/2019 | Yu | G06F 3/047 |
| 2019/0138141 A1* | 5/2019 | Jeong | G06F 3/0412 |
| 2019/0271912 A1* | 9/2019 | Li | H05K 3/027 |
| 2020/0194468 A1* | 6/2020 | Luo | H05K 1/117 |
| 2021/0013270 A1* | 1/2021 | Yu | H01L 51/5253 |

* cited by examiner

[Figure 1]
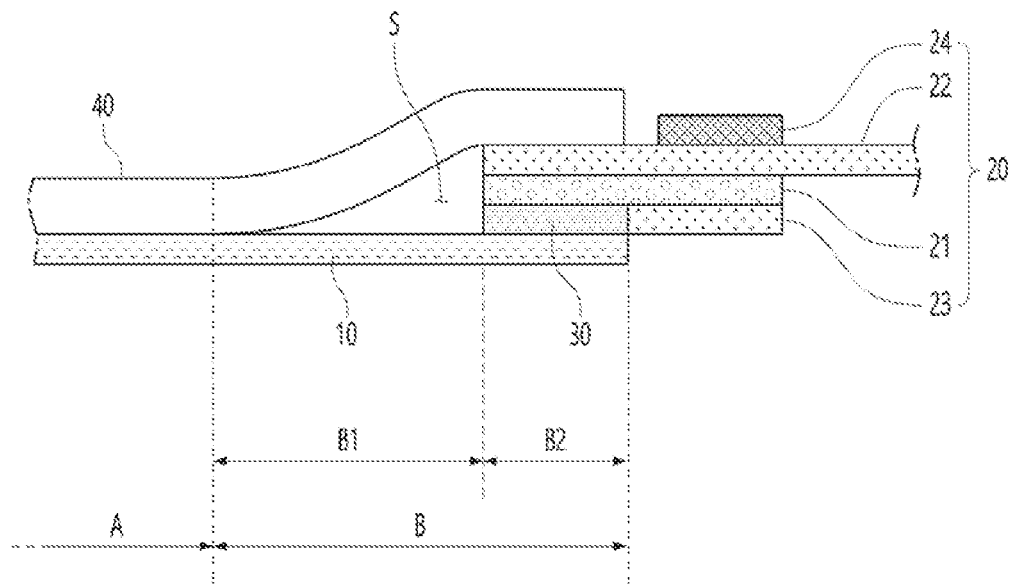
[Figure 2]
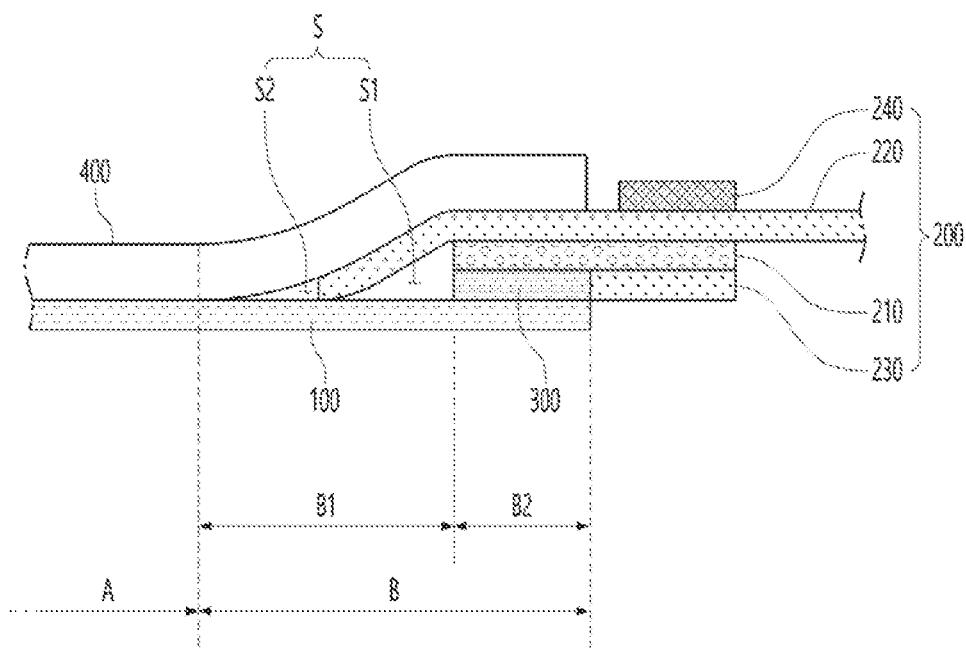

[Figure 3]
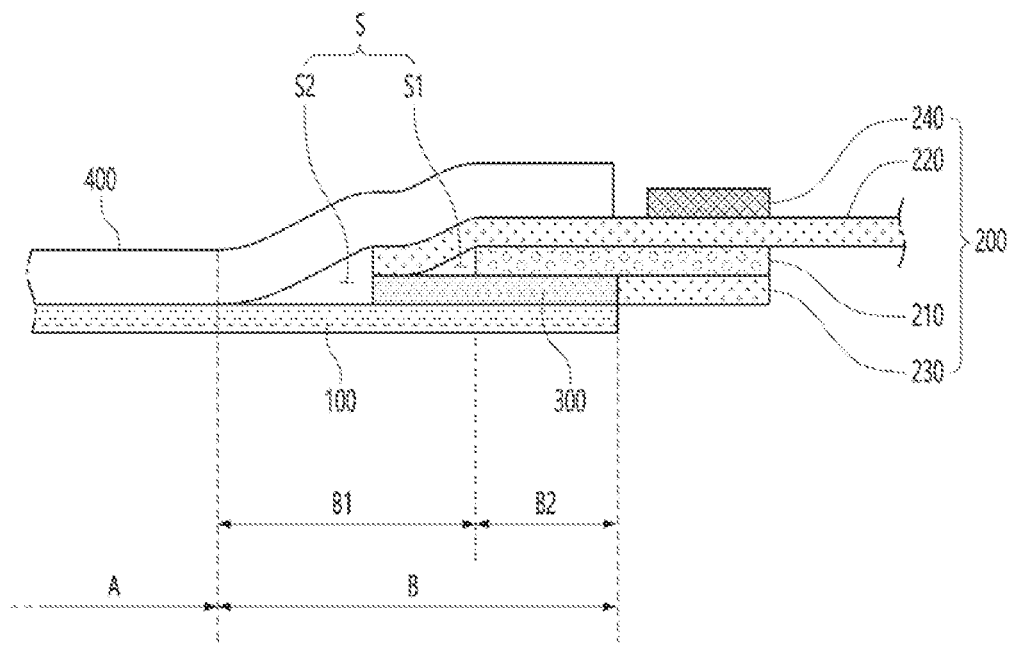
[Figure 4]
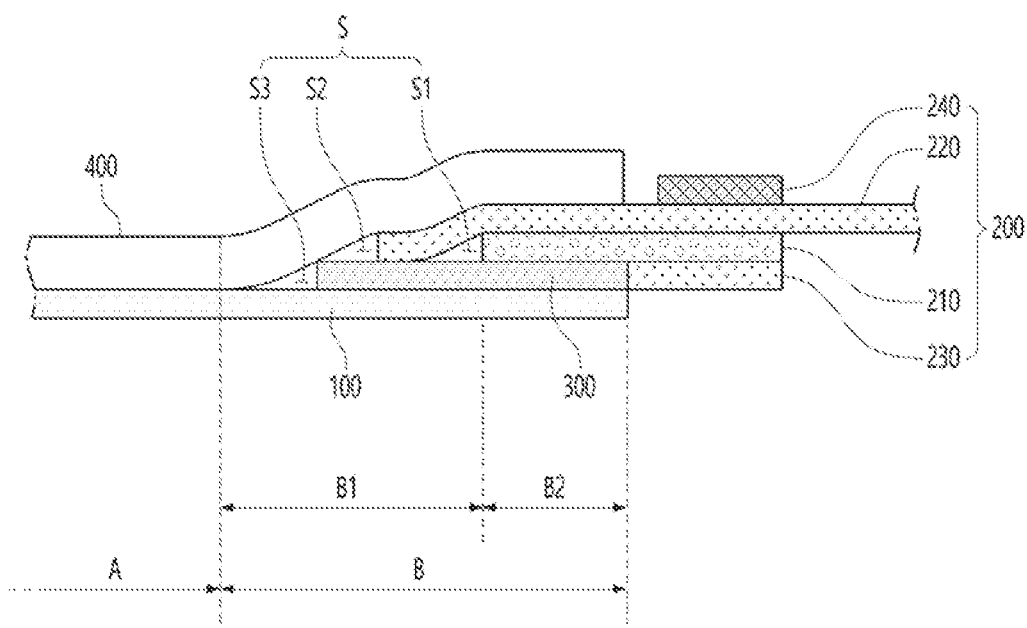

[Figure 5]
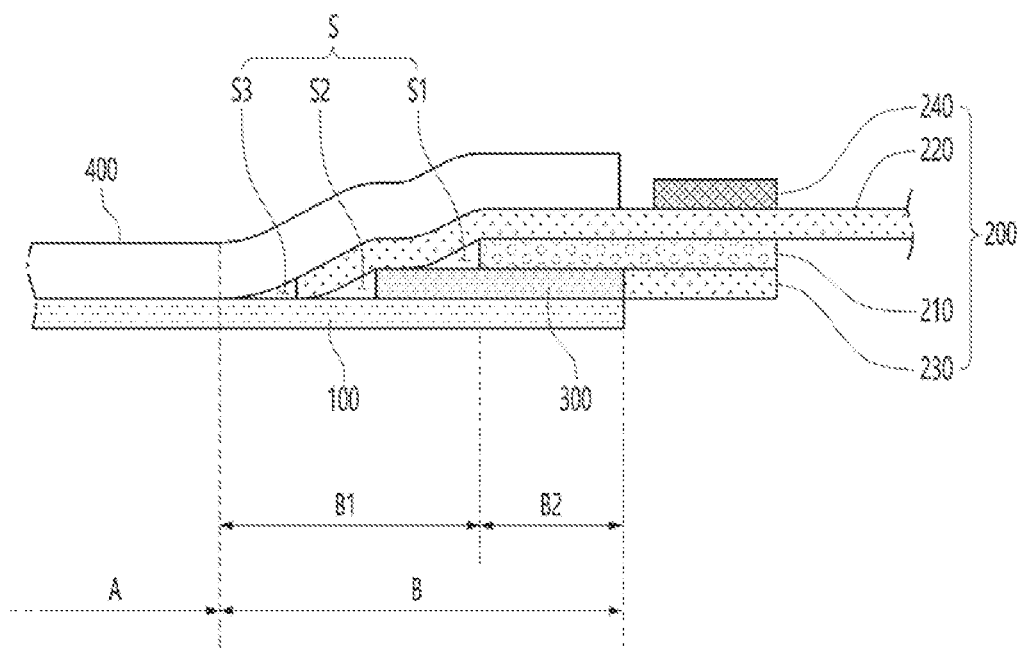
[Figure 6]
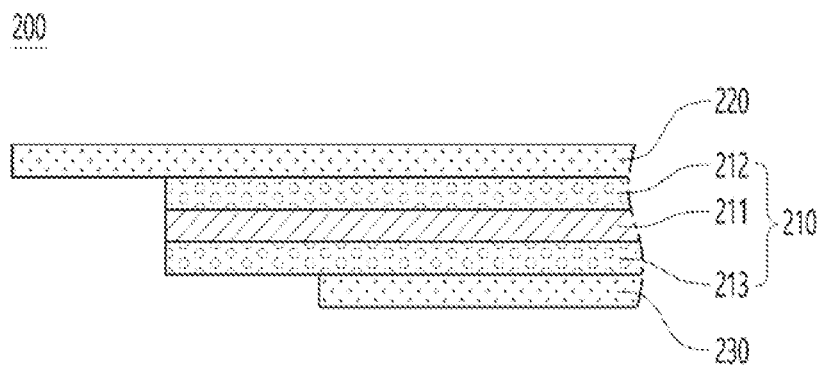

[Figure 7]
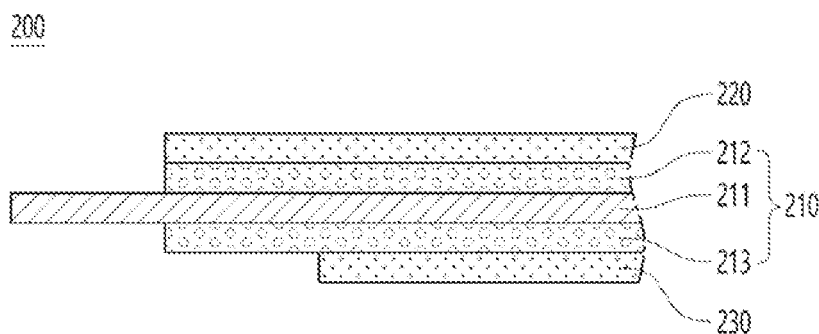
[Figure 8]
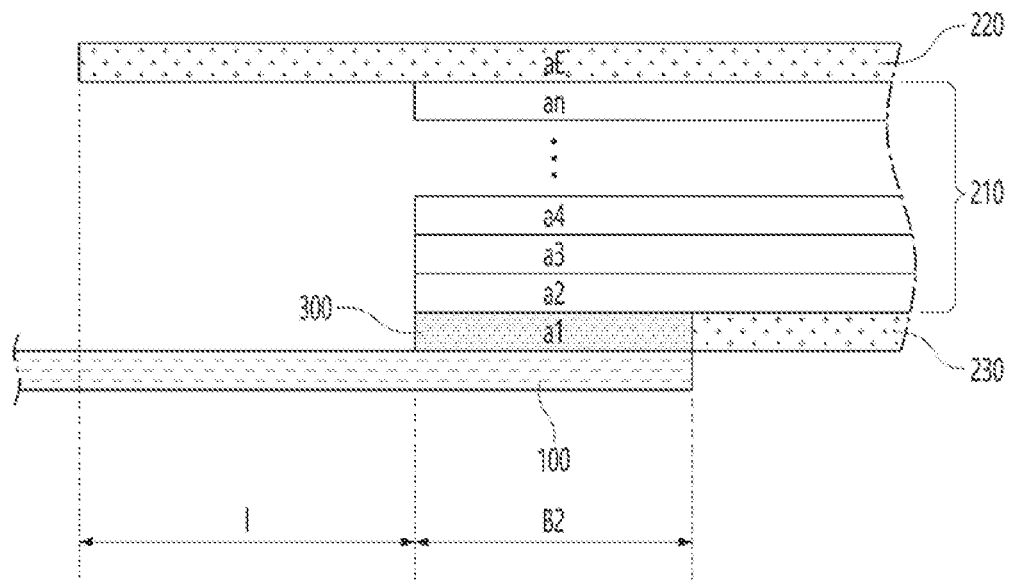

TOUCH SENSOR, AND WINDOW LAMINATE AND IMAGE DISPLAY DEVICE INCLUDING THE SAME

CROSS REFERENCE TO RELATED APPLICATIONS

This application claims priority based on Korean Patent Application No. 10-2019-0090521, filed Jul. 25, 2019, the entire content of which is incorporated herein by reference in its entirety.

TECHNICAL FIELD

The present invention relates to a touch sensor. Particularly, the present invention relates to a touch sensor with a reduced bezel area.

BACKGROUND ART

A display device is a device that displays information externally, examples of which include a liquid crystal display device, a plasma display panel device, an electroluminescent display device, and an organic light emitting diode display device. The display device includes a touch sensor, which is an apparatus for inputting a user's command by touching contents displayed on the screen with a finger or a pen.

The touch sensor may include a display part having a plurality of sensing electrodes for sensing touch locations on a substrate, a bezel part having a trace for transferring touch input signals to an FPCB (Flexible Printed Circuit Board), a bonding pad, and so on.

The sensing electrodes are arranged in directions of X and Y axes and connected with each other, outer ends of which are electrically connected to wiring of the trace. The wiring may be connected to the FPCB via the bonding pad.

FIG. 1 is a cross-sectional view of a touch sensor according to a prior art.

As shown in FIG. 1, the prior art touch sensor comprises a touch sensor panel 10, an FPCB 20, a conductive adhesive layer 30, a protective layer 40, and so on.

The touch sensor panel 10 includes a display part A having a sensing electrode and a bezel part B having a trace B1 and a bonding pad B2.

The FPCB 20 includes an FPC electrode layer 21, an upper cover layer 22, a lower cover layer 23, and so on. One end of the FPC electrode layer 21 is connected to the bonding pad B2. The upper cover layer 22 is coupled to an upper portion of the FPC electrode layer 21, and the lower cover layer 23 is coupled to a lower portion of the FPC electrode layer 21 while opening a portion of the FPC electrode layer 21. The FPCB 20 may include an IC chip 24 on the upper cover layer 22.

The conductive adhesive layer 30 is coupled between the bonding pad B2 and the FPC electrode layer 21 to electrically connect the touch sensor panel 10 and the FPCB 20.

The protective layer 40 may cover the touch sensor panel 10 and the upper cover layer 22 of the bezel part B2.

However, in the conventional touch sensor having such a structure, a space S may be generated between the protective layer 40 and the touch sensor panel 10 in the bezel part B, due to the step difference of the FPCB 20. In this space S, the protective layer 40 and the touch sensor panel 10 can be separated in the bezel part B to deteriorate module stability and, as a result, it may cause a problem of increasing the width of the bezel part B.

DISCLOSURE OF INVENTION

Technical Problem

The present invention is to solve the above problems of the prior art and it is intended to provide a touch sensor having the following features:

first, in the bezel part, the space between the touch sensor panel and the protective layer is minimized to increase the module stability; and second, the width of the bezel can be reduced.

Technical Solution

A touch sensor according to an aspect of the present invention for achieving this object may be configured of a touch sensor panel, an FPCB, a conductive adhesive layer, a protective layer, and so on.

The touch sensor panel may include a display part having a sensing electrode and a bezel part having a trace and a bonding pad.

The FPCB may include an FPC electrode layer, an upper cover layer, a lower cover layer, and so on. One side of the FPC electrode layer may be connected to the bonding pad. The upper cover layer may be coupled to an upper portion of the FPC electrode layer. The upper cover layer may extend to at least a portion of the trace including the bonding pad. The lower cover layer may be coupled to a lower portion of the FPC electrode layer while opening a portion of the FPC electrode layer.

The conductive adhesive layer may be coupled between the bonding pad and the FPC electrode layer.

The protective layer may cover the touch sensor panel and the upper cover layer of the bezel part area.

In the touch sensor according to an aspect of the present invention, the conductive adhesive layer may extend to an extended end of the upper cover layer.

In the touch sensor according to an aspect of the present invention, the conductive adhesive layer may extend beyond an extended end of the upper cover layer.

In the touch sensor according to an aspect of the present invention, the conductive adhesive layer may extend shorter than an extended end of the upper cover layer.

A touch sensor according to an aspect of the present invention may be configured of a touch sensor panel, an FPCB, a conductive adhesive layer, a protective layer, and so on.

The touch sensor panel may include a display part having a sensing electrode and a bezel part having a trace and a bonding pad.

The FPCB may include an FPC electrode layer, an upper cover layer, a lower cover layer, and so on. One side of the FPC electrode layer may be connected to the bonding pad. The FPC electrode layer may include an insulation layer, an upper FPC electrode layer coupled to an upper portion of the insulation layer, and a lower FPC electrode layer coupled to a lower portion of the insulation layer to connect to the bonding pad. The insulation layer may extend to at least a portion of the trace including the bonding pad. The upper cover layer may be coupled to an upper portion of the FPC electrode layer, and the lower cover layer may be coupled to a lower portion of the FPC electrode layer while opening a portion of the FPC electrode layer.

The conductive adhesive layer may be coupled between the bonding pad and the FPC electrode layer.

The protective layer may cover the touch sensor panel and the upper cover layer of the bezel part area.

In the touch sensor according to an aspect of the present invention, the conductive adhesive layer may extend to an extended end of the insulation layer.

In the touch sensor according to an aspect of the present invention, the conductive adhesive layer may extend beyond an extended end of the insulation layer.

In the touch sensor according to an aspect of the present invention, the conductive adhesive layer may extend shorter than an extended end of the insulation layer.

In the touch sensor according to the present invention, the protective layer may form two or more stepped bent portions in the bezel part.

In the touch sensor according to the present invention, the protective layer may be at least one of a polarizer, a polarizing plate, a retardation film, a reflective sheet, a brightness enhancing film, and a refractive index matching film.

In the touch sensor according to the present invention, an extended length $\ell$ of the upper cover layer, the conductive adhesive layer, or the insulation layer extended the longest among the upper cover layer, the conductive adhesive layer, and the insulation layer may be represented by the following equation:

$$\ell = (\sqrt{2}-1)\Sigma_{n=1}^{e-1} an + \Sigma_{n=1}^{n} an - aE + 0.2$$

Here, aE is a thickness of the longest extended layer, an is a thickness of each laminated layer, n is the number of layers except the longest extended layer, and 'e−1' means the number of layers from the lowest layer to a layer before the longest extended layer.

A window laminate according to the present invention may comprise the touch sensor described above and a window substrate coupled to the touch sensor.

An image display device according to the present invention may comprise the touch sensor described above and a display panel coupled to the touch sensor.

Advantageous Effects

According to the touch sensor of the present invention having such a configuration, by extending the upper cover layer, insulation layer, etc. of the FPCB, it is possible to reduce the space generated by the step difference of the FPCB between the touch sensor panel and the protective layer. This increases the degree of bonding of the touch sensor panel and the protective layer in the bezel part, thereby improving module stability.

In addition, according to the touch sensor of the present invention, it is possible to decrease the width of the bezel part by reducing the space between the touch sensor panel and the protective layer.

DESCRIPTION OF DRAWINGS

FIG. 1 is a cross-sectional view of a touch sensor according to a prior art.

FIG. 2 is a cross-sectional view of a touch sensor according to the first embodiment of the present invention.

FIG. 3 is a cross-sectional view of a touch sensor according to the second embodiment of the present invention.

FIG. 4 is a cross-sectional view of a touch sensor according to the third embodiment of the present invention.

FIG. 5 is a cross-sectional view of a touch sensor according to the fourth embodiment of the present invention.

FIG. 6 is a cross-sectional view of a touch sensor according to the fifth embodiment of the present invention.

FIG. 7 is a cross-sectional view of a touch sensor according to the sixth embodiment of the present invention.

FIG. 8 is a view for explaining an optimal extension length of the longest extension layer in a touch sensor according to the present invention.

BEST MODE

Hereinafter, the present invention will be described in detail with reference to the accompanying drawings.

FIG. 2 is a cross-sectional view of a touch sensor according to the first embodiment of the present invention.

As shown in FIG. 2, the touch sensor according to an aspect of the present invention may be composed of a touch sensor panel 100, an FPCB 200, a conductive adhesive layer 300, a protective layer 400, and so on.

The touch sensor panel 100 may include a display part A having a sensing electrode, a bezel part B having a trace B1 and a bonding pad B2, and so on.

The display part A is for sensing a touch signal, which may be composed of a separation layer, a sensing electrode layer, and so on.

The separation layer may be a polymer organic film, and it may be made of, for example, polyimide, poly vinyl alcohol, polyamic acid, polyamide, polyethylene, polystyrene, or the like.

The sensing electrode layer is formed on the separation layer to sense whether a touch has occurred, which may be formed of metal, metal nanowire, metal oxide, carbon nanotube, graphene, conductive polymer, conductive ink, etc.

The bezel part B may include the trace B1 having wiring for transferring touch signals sensed at the sensing electrode layer to the bonding pad and the bonding pad B2 for transferring the touch signals transferred via the wiring to the FPCB 200. The wiring and the bonding pad may be formed of a conductor such as metal, metal nanowire, metal oxide, carbon nanotube, graphene, conductive polymer, conductive ink, etc.

The FPCB 200 may include an FPC electrode layer 210, an upper cover layer 220, a lower cover layer 230, and so on.

The FPC electrode layer 210 is a conductive layer, one side of which may be connected to the bonding pad B2. The FPC electrode layer 210 may be formed of a conductor such as metal, metal nanowire, metal oxide, etc.

The upper cover layer 220 is an insulation layer, which may be coupled to an upper portion of the FPC electrode layer 210. The upper cover layer 220 may be made of polyimide, or the like. The upper cover layer 220 may be made of a polyimide in a film form and an epoxy adhesive layer may be formed on one side thereof to make a two-layer structure. For example, the polyimide film may have a thickness of 12 to 25 μm and the epoxy adhesive layer may have a thickness of 25 μm.

The upper cover layer 220 may extend to at least a portion of the trace B1 including the bonding pad B2. As illustrated in FIG. 2, when the upper cover layer 220 extends to the trace B1 area, the extended portion of the upper cover layer 220 may partially fill a space S (S1 and S2) between the touch sensor panel 100 and the protective layer 400 in the trace B1 area, and, as a result, a degree of bonding between the touch sensor panel 100 and the protective layer 400 may be increased.

In addition, when the degree of bonding between the touch sensor panel 100 and the protective layer 400 is improved, the space S (S1 and S2) between the touch sensor panel 100 and the protective layer 400 can be reduced, compared to the prior art. As a result, a width of the trace B1 can be reduced, and further, a width of the bezel portion B can be reduced.

The lower cover layer 230 may be coupled to a lower portion of the FPC electrode layer 210 while opening a portion of a lower surface of the FPC electrode layer 210. The lower cover layer 230, like the upper cover layer 220, may be formed of polyimide or the like as an insulation layer. The lower cover layer 230 may be made of a polyimide in a film form and an epoxy adhesive layer may be formed on one side thereof to form a two-layer structure. The polyimide film may have a thickness of 12 to 25 µm and the epoxy adhesive layer may have a thickness of 25 µm.

The conductive adhesive layer 300 may be coupled between the bonding pad B2 and the FPC electrode layer 210 to electrically connect the bonding pad B2 and the FPC electrode layer 210. The conductive adhesive layer 300 may be one in which conductive fillers such as silver, copper, nickel, carbon, aluminum and plating are dispersed in binders such as epoxy, silicone, urethane and polyimide resins. The conductive adhesive layer 300 may be an anisotropic conductive film (ACF) or a layer of anisotropic conductive material.

The protective layer 400 may cover the touch sensor panel 100 and the upper cover layer 220 of the bezel part B. The protective layer 400 may be a polarizer, a polarizing plate, a retardation film, a reflective sheet, a brightness enhancing film, a refractive index matching film or the like, or a laminate of two or more layers among them.

The protective layer 400 may form a stepped bent portion in the bezel part B. The stepped bent portion may be caused by the upper cover layer 220 extending into the trace B1 area. When the upper cover layer 220 extends to the upper surface of the touch sensor panel 100, at least two stepped bent portions may be formed.

FIG. 3 is a cross-sectional view of a touch sensor according to the second embodiment of the present invention.

As shown in FIG. 3, in the second embodiment, an upper cover layer 220 may extend to at least a portion of a trace B1 including a bonding pad B2.

A conductive adhesive layer 300 may also extend to at least a portion of the trace B1 including the bonding pad B2, like the upper cover layer 220. At this time, the conductive adhesive layer 300 may extend to the same length as the upper cover layer 220.

When the upper cover layer 220 and the conductive adhesive layer 300 extend to the trace B1 area, the extended portions of the upper cover layer 220 and the conductive adhesive layer 300 may partially fill the space between the touch sensor panel 100 and the protective layer 400 in the trace B1 area, and a degree of bonding between a touch sensor panel 100 and a protective layer 400 may be increased. As a result, a width of the trace B1 can be reduced, which also reduces a width of the bezel part B.

Since the rest of the configuration of the second embodiment is the same as the corresponding configuration of the first embodiment, detailed description of the rest of the configuration is replaced by the relevant description of the first embodiment.

FIG. 4 is a cross-sectional view of a touch sensor according to the third embodiment of the present invention.

As shown in FIG. 4, in the third embodiment, an upper cover layer 220 may extend to at least a portion of a trace B1 including a bonding pad B2.

A conductive adhesive layer 300 may also extend to at least a portion of the trace B1 including the bonding pad B2, like the upper cover layer 220. At this time, the conductive adhesive layer 300 may extend beyond the upper cover layer 220.

When the upper cover layer 220 and the conductive adhesive layer 300 extend to the trace B1 area, if the conductive adhesive layer 300 in a lower position extends further than the upper cover layer 220 in a higher position, the extended portions of the upper cover layer 220 and the conductive adhesive layer 300 may fill a space between a touch sensor panel 100 and a protective layer 400 in the trace B1 area more efficiently. As a result, a degree of bonding between the touch sensor panel 100 and the protective layer 400 may be further increased. Furthermore, by further reducing the space S (S1, S2, and S3) between the touch sensor panel 100 and the protective layer 400 than the first and second embodiments, a width of the trace B1, that is, a width of the bezel part B can be further reduced than in the first and second embodiments.

Since the rest of the configuration of the third embodiment is the same as the corresponding configuration of the first embodiment, detailed description of the rest of the configuration is replaced by the relevant description of the first embodiment.

FIG. 5 is a cross-sectional view of a touch sensor according to the fourth embodiment of the present invention.

As shown in FIG. 5, in the fourth embodiment, an upper cover layer 220 may extend to a portion of a trace B1 including a bonding pad B2.

A conductive adhesive layer 300 may also extend to at least a portion of the trace B1 including the bonding pad B2, like the upper cover layer 220, while extending shorter than the upper cover layer 220.

When the upper cover layer 220 and the conductive adhesive layer 300 extend to the trace B1, if the conductive adhesive layer 300 in a lower position extends shorter than the upper cover layer 220 in a higher position, the upper cover layer 220 extends beyond the extended end of the conductive adhesive layer 300 to an upper surface of a touch sensor panel 100 to fill a space between a touch sensor panel 100 and a protective layer 400 in the trace B1 area, thereby increasing a degree of bonding between the touch sensor panel 100 and the protective layer 400. In this case, improvement of the degree of bonding between the touch sensor panel 100 and the protective layer 400, that is, the space S (S1, S2, and S3) between the touch sensor panel 100 and the protective layer 400, may be similar to that of the third embodiment. As a result, a width of the trace B1, that is, a width of the bezel part B, can also be reduced similarly to the third embodiment.

Since the rest of the configuration of the fourth embodiment is the same as the corresponding configuration of the first embodiment, detailed description of the rest of the configuration is replaced by the relevant description of the first embodiment.

FIG. 6 is a cross-sectional view of a touch sensor according to the fifth embodiment of the present invention.

As shown in FIG. 6, in the fifth embodiment, an FPC electrode layer 210 in an FPCB 200 may be configured as a multi-layer structure of, for example, an insulation layer 211, an upper FPC electrode layer 212 coupled to an upper portion of the insulation layer 211, a lower FPC electrode layer 213 coupled to a lower portion of the insulation layer 211, and so on. In this case, an upper cover layer 220 may be coupled to an upper portion of the upper FPC electrode layer 212, and a lower cover layer 230 may be coupled to a lower portion of the lower FPC electrode layer 213 while opening a portion of the lower FPC electrode layer 213. The open lower FPC electrode layer 213 may be connected to a bonding pad B2.

In the fifth embodiment having such a structure, the upper cover layer 220 may extend to at least a portion of a trace B1 including the bonding pad B2 as in the first embodiment. However, in the fifth embodiment, since the FPCB 200 is thicker than the FPCB 200 of the first embodiment, the step difference may be large. Accordingly, it may be desirable to extend the upper cover layer 220 of the fifth embodiment longer than the upper cover layer 220 of the first embodiment.

When the upper cover layer 220 extends to the trace B1 area, the extended portion of the upper cover layer 220 partially fills a space between a touch sensor panel 100 and a protective layer 400 in the trace B1 area, thereby increasing a degree of bonding between the touch sensor panel 100 and the protective layer 400. As a result, a width of the trace B1 is reduced to also reduce a width of the bezel part B.

Although the illustration of the rest of the configuration of the touch sensor, that is, a touch sensor panel 100, a conductive adhesive layer 300, a protective layer 400, and so on, is omitted in FIG. 6, they can be applied to the fifth embodiment as well. Detailed description of the rest of the configuration is replaced by the relevant description of the first embodiment.

FIG. 7 is a cross-sectional view of a touch sensor according to the sixth embodiment of the present invention.

As shown in FIG. 7, in the sixth embodiment, an FPC electrode layer 210 may be configured as a multi-layer structure of, for example, an insulation layer 211, an upper FPC electrode layer 212, a lower FPC electrode layer 213, and so on as in the fifth embodiment. In the sixth embodiment having such a structure, the insulation layer 211 may extend to at least a portion of a trace B1 including a bonding pad B2 unlike the fifth embodiment. In this case, the insulation layer 211 may extend as long as the upper cover layer 220 extends in the first embodiment.

When the insulation layer 211 extends to the trace B1 area, the extended portion of the insulation layer 211 partially fills a space between a touch sensor panel 100 and a protective layer 400 in the trace B1 area, thereby increasing a degree of bonding between the touch sensor panel 100 and the protective layer 400. As a result, a width of the trace B1 is reduced to also reduce a width of the bezel part B.

Although the illustration of the rest of the configuration of the touch sensor, that is, a touch sensor panel 100, a conductive adhesive layer 300, a protective layer 400, and so on, is omitted in FIG. 7, they can be applied to the sixth embodiment as well. Detailed description of the rest of the configuration is replaced by the relevant description of the first embodiment.

FIG. 8 is a view for explaining an optimal extension length of the longest extension layer in a touch sensor according to the present invention.

In the touch sensor of the present invention, an upper cover layer 220, a conductive adhesive layer 300, or an insulation layer 211 may extend to a trace B1 area independently or in combination with other configurations. At this time, the extended length $\ell$ of the upper cover layer 220, the conductive adhesive layer 300, or the insulation layer 211 that extends the longest may be represented by the following equation:

$$\ell = (\sqrt{2}-1)\Sigma_{n=1}^{e-1} a_n + \Sigma_{n=1}^{n} a_n - a_E + 0.2$$

Here, aE is a thickness of the longest extended layer, and an is a thickness of each laminated layer. n is the number of layers except the longest extended layer, and 'e−1' represents the number of layers from the lowest layer (including the conductive adhesive layer) to a layer before the longest extended layer.

For example, in a touch sensor in which an FPCB comprised of a lower FPC electrode layer, an insulation layer, an upper FPC electrode layer, and an upper cover layer (the longest extended layer) is connected to a bonding pad via a conductive adhesive layer (an=1), the optimal extension length of the upper cover layer, which is the longest extended layer, is ($\sqrt{2}$−1)(0.02+0.01+0.025+0.01)+(0.02+0.01+0.025+0.01)−0.04+0.2=0.25 mm when the thicknesses of the conductive adhesive layer, the lower FPC electrode layer, the insulation layer, the upper FPC electrode layer, and the upper cover layer are 0.02 mm, 0.01 mm, 0.025 mm, 0.01 mm, and 0.04 mm, respectively. That is, when the upper cover layer is extended to a length of 0.25 mm, a space between a touch sensor panel and a protective layer can be minimized, that is, a degree of bonding between the touch sensor panel and the protective layer can be maximized.

A window laminate according to the present invention may include a touch sensor described above and a window substrate coupled to one side of the touch sensor.

An image display device according to the present invention may include a touch sensor described above and a display panel coupled to one side of the touch sensor.

In the above, the present invention has been described through various embodiments, which are intended to illustrate the present invention. Those skilled in the art will be able to modify or revise these embodiments in other forms. However, since the scope of the present invention is defined by the claims below, it can be interpreted that such modifications or revisions are included in the scope of the present invention.

DESCRIPTION OF REFERENCE NUMERALS 10,100: touch sensor panel
20,200: FPCB
21,210: FPC electrode layer
211: insulation layer
212: upper FPC electrode layer
213: lower FPC electrode layer
22,220: upper cover layer
23,230: lower cover layer
24,240: IC chip
30,300: conductive adhesive layer
40,400: protective layer
A: display part (display area)
B: bezel part (bezel area)
B1: trace (trace area)
B2: bonding pad (bonding area)
S, S1, S2, S3: space

The invention claimed is:
1. A touch sensor comprising:
a touch sensor panel including a display part having a sensing electrode and a bezel part having a trace and a bonding pad;
an FPCB including an FPC electrode layer having one side connected to the bonding pad, an upper cover layer coupled to an upper portion of the FPC electrode layer, and a lower cover layer coupled to a lower portion of the FPC electrode layer while opening a portion of the FPC electrode layer, wherein the upper cover layer extends to at least a portion of the trace including the bonding pad;

a conductive adhesive layer coupled between the bonding pad and the FPC electrode layer; and a protective layer covering the touch sensor panel and the upper cover layer of the bezel part.

2. The touch sensor according to claim 1, wherein the conductive adhesive layer extends to an extended end of the upper cover layer.

3. The touch sensor according to claim 1, wherein the conductive adhesive layer extends beyond an extended end of the upper cover layer.

4. The touch sensor according to claim 1, wherein the conductive adhesive layer extends shorter than an extended end of the upper cover layer.

5. The touch sensor according to claim 1, wherein the protective layer forms two or more stepped bent portions in the bezel part.

6. The touch sensor according to claim 5, wherein the protective layer is at least one of a polarizer, a polarizing plate, a retardation film, a reflective sheet, a brightness enhancing film, and a refractive index matching film.

7. The touch sensor according to claim 1, wherein an extended length $\ell$ of the upper cover layer, the conductive adhesive layer, or the insulation layer extended the longest among the upper cover layer, the conductive adhesive layer, and the insulation layer is a value calculated by the following equation:

$$\ell = (\sqrt{2}-1)\Sigma_{n=1}^{e-1} a n + \Sigma_{n=1}^{n} a n - aE + 0.2,$$

wherein, aE is a thickness of the longest extended layer, an is a thickness of each laminated layer, n is the number of layers except the longest extended layer, and 'e−1' is the number of layers from the lowest layer to a layer before the longest extended layer.

8. A window laminate comprising:
a window substrate; and
the touch sensor according to claim 1 coupled to the window substrate.

9. An image display device comprising:
a display panel; and
the touch sensor according to claim 1 coupled to the display panel.

10. A touch sensor comprising:
a touch sensor panel including a display part having a sensing electrode and a bezel part having a trace and a bonding pad;
an FPCB including an FPC electrode layer having one side connected to the bonding pad, an upper cover layer coupled to an upper portion of the FPC electrode layer, and a lower cover layer coupled to a lower portion of the FPC electrode layer while opening a portion of the FPC electrode layer, wherein the FPC electrode layer includes an insulation layer, an upper FPC electrode layer coupled to an upper portion of the insulation layer, and a lower FPC electrode layer coupled to a lower portion of the insulation layer to connect to the bonding pad, and the insulation layer extends to at least a portion of the trace including the bonding pad;

a conductive adhesive layer coupled between the bonding pad and the FPC electrode layer; and a protective layer covering the touch sensor panel and the upper cover layer of the bezel part.

11. The touch sensor according to claim 10, wherein the conductive adhesive layer extends to an extended end of the insulation layer.

12. The touch sensor according to claim 10, wherein the conductive adhesive layer extends beyond an extended end of the insulation layer.

13. The touch sensor according to claim 10, wherein the conductive adhesive layer extends shorter than an extended end of the insulation layer.

14. The touch sensor according to claim 10, wherein the protective layer forms two or more stepped bent portions in the bezel part.

15. The touch sensor according to claim 14, wherein the protective layer is at least one of a polarizer, a polarizing plate, a retardation film, a reflective sheet, a brightness enhancing film, and a refractive index matching film.

16. The touch sensor according to claim 10, wherein an extended length $\ell$ of the upper cover layer, the conductive adhesive layer, or the insulation layer extended the longest among the upper cover layer, the conductive adhesive layer, and the insulation layer is a value calculated by the following equation:

$$\ell = (\sqrt{2}-1)\Sigma_{n=1}^{e-1} a n + \Sigma_{n=1}^{n} a n - aE + 0.2,$$

wherein, aE is a thickness of the longest extended layer, an is a thickness of each laminated layer, n is the number of layers except the longest extended layer, and 'e−1' is the number of layers from the lowest layer to a layer before the longest extended layer.

17. A window laminate comprising:
a window substrate; and
the touch sensor according to claim 10 coupled to the window substrate.

18. An image display device comprising:
a display panel; and
the touch sensor according to claim 10 coupled to the display panel.

* * * * *